United States Patent [19]

Jiang

[11] Patent Number: 5,913,002
[45] Date of Patent: Jun. 15, 1999

[54] OPTICAL COUPLING DEVICE FOR PASSIVE ALIGNMENT OF OPTOELECTRONIC DEVICES AND FIBERS

[75] Inventor: Ching-Long Jiang, Belle Mead, N.J.

[73] Assignee: The Whitaker Corporation, Wilmington, Del.

[21] Appl. No.: 09/031,585

[22] Filed: Feb. 27, 1998

Related U.S. Application Data

[60] Provisional application No. 60/070,280, Dec. 31, 1997.

[51] Int. Cl.$^6$ ...................................................... G02B 6/36
[52] U.S. Cl. ............................................. 385/88; 385/93
[58] Field of Search .................................... 385/88–94, 60, 385/72, 78

[56] References Cited

U.S. PATENT DOCUMENTS

| | | | |
|---|---|---|---|
| 4,210,923 | 7/1980 | North et al. | 357/30 |
| 5,179,609 | 1/1993 | Blonder et al. | 385/89 |
| 5,515,468 | 5/1996 | DeAndrea et al. | 385/88 |
| 5,708,743 | 1/1998 | DeAndrea et al. | 385/88 |
| 5,774,614 | 6/1998 | Gilliland et al. | 385/88 |
| 5,842,696 | 12/1998 | Collins | 385/88 |

*Primary Examiner*—Phan T. H. Palmer
*Attorney, Agent, or Firm*—William S. Francos

[57] ABSTRACT

A passive alignment scheme for aligning surface emitting/detecting optical electronic devices to optical fibers through the use of a mini-MT ferrule used in a RJ connector by way of silicon waterboard technology. The mini-MT ferrule has guide pins which are use to align the optical fiber ultimately to the optoelectronic device.

6 Claims, 4 Drawing Sheets

OPTICAL COUPLING DEVICE FOR PASSIVE ALIGNMENT OF OPTOELECTRONIC DEVICES AND FIBERS

This application claims the benefit of U.S. Provisional Application No. 60/070,280, filed Dec. 31, 1997.

FIELD OF THE INVENTION

The present invention relates to a device for passively aligning an optical fiber to an optoelectronic device. The present application is related to U.S. patent applications Ser. Nos. 09/031,592 filed Feb. 27, 1998 and 09/031,586 filed Feb. 27, 1998, the disclosures of which are incorporated herein by reference.

BACKGROUND OF THE INVENTION

The use of silicon substrates as an optical bench, preferably known as silicon waferboard technology, has gained a great deal of popularity in passive alignment of optoelectronic devices, passive elements and optical fibers. The use of silicon waferboard as an optical bench generally utilizes etched features in the silicon waferboard, for example the grooves for holding the optical fiber. The silicon waferboard is a monocrystalline material, anisotropic etching is done to create the v grooves for holding the fiber along the surface of the silicon wafer and alignment fiducials used to hold edge emitting optoelectronic devices and effect passive alignment. Further details of anisotropic etching to effect v grooves and alignment feducials can be found for examples in U.S. Pat. No. 4,210,923 to North et al. Furthermore, amorphous silicon can be used as the optical bench, with other known techniques such as reactive ion etching (RIE) to effect fiducials utilized for alignment.

The alignment of an optical fiber to an optoelectronic device in silicon waferboard is most readily effected by the coupling of the fiber to an edge emitting optoelectronic device. This is because of the geometry of the silicon waferboard. The fiber is usually held in an etched v groove on the silicon waferboard, and the alignment of the edge emitting optoelectronic device to the fiber relies on precision alignment pedestals on silicon waferboard and the precision notch on the edge emitting optoelectronic device. Thereafter, some type of sealing or covering is required for practical application. This type of technology has been exploited greatly. An emerging technology in the optical communications industry is surface emitting and detecting devices. Devices such as vertical cavity surface emitting lasers (VCSELs), surface emitting light emitting diodes as well as most PIN detectors have a photosensitive surface to receive or emit light from or to the top) or bottom surface. These devices have certain benefits, and alignment of devices such as these to optical fibers has proved relatively difficult requiring relatively complicated optical structures and paths to effect the coupling. Some success has been met in coupling surface emitting and detecting devices through a 90 degree molded optic coupler as is disclosed in U.S. Pat. Nos. 5,515,468 and 5,708,743 to DeAndrea, et al. the disclosures of which are specifically incorporated herein by reference. This technology which has demonstrated success from a manufacturing perspective makes use of polymer molded integrated light coupling devices suitable for coupling light from an optical electronic device to an optical fiber and vice versa. The polymer molded integrated light coupling device incorporates many functions in a single device. However, the active alignment process of turning the optical electronic device on to maximize coupling while aligning is still required.

Other techniques which incorporate the emerging silicon optical bench technology have also been used. These technologies, like the molded optic coupler of the DeAndrea, et al. patents require the device to be disposed on a different plane than the fiber with the light being communicated there between by a reflective surface. Examples of such techniques are found in U.S. Pat. Nos. 5,073,003 and 4,904,036 to Clark and Blonder respectively, the disclosures of which are specifically incorporated herein by reference. While such technology has its merits in allowing passive alignment to some extent, it is nonetheless required that the device be actively aligned and positioned so that light is properly reflected by the reflective surface. Furthermore, as can be appreciated, these devices which require a reflective surface to effect coupling reduce the efficiency of the device as there are intrinsic losses incurred at each optical surface through dispersive effects. Accordingly, a more efficient system would allow for an in line coupling between the optical fiber and the device.

U.S. Pat. No. 5,179,609 to Blonder, et al. discloses an example of the use of silicon waferboard to effect coupling between the device and the fiber in a co-linear fashion. The disclosure of this patent is specifically incorporated herein by reference. This reference makes use of two pieces of monocrystalline material as mounting members that have etched therein detense and complimentary locations on each of the pieces of the members. These detents receive microspheres to effect alignment of the mounting members to effect the coupling of the device to the fiber. This is a relatively complicated structure and not practical from manufacturing perspective. Another example of a technique for in-line alignment of an optical fiber to a surface emitting/receiving optoelectronic device is as disclosed in U.S. patent application Ser. No. 08/674,770 assigned to the assignee of the present application, to Boudreau, et al., the disclosure of which is specifically incorporated herein by reference. The reference Boudreau, et al., discloses an alignment frame for coupling an optical fiber to an optical electronic device with the optical electronic device readily and accurately placed and bonded to the frame by way of alignment pedestals and standoffs. This passive alignment member has certain benefits as are discussed in the application referenced above. The invention to Boudreau, et al., is a pigtailed device.

Accordingly, what is needed is a connectorized device which enables the coupling of an optical fiber to an optical electronic device which is either surface emitting or surface receiving in a passively aligned manner.

SUMMARY OF THE INVENTION

The present invention relates to a passive alignment scheme for aligning surface emitting/detecting optical electronic devices to optical fibers through the use of a mini-MT ferrule used in a RJ connector by way of silicon waferboard technology. The mini-MT ferrule has guide pins which are used to align the optical fiber ultimately to the optoelectronic device. A light coupling device having holes for receiving the guide pins as well as lens elements for coupling light between the optical fibers and the optical electronic devices is used. The light coupling device is positioned between the optical fibers in the ferrule and the optoelectronic devices mounted on the silicon waferboard and has a recess on each end to accurately control the distance between the lenses and the optical electronic devices as well as the distance between the lenses and the optical fibers. Additionally, the distance between the lens and guide pinholes is precisely controlled to properly effect the alignment of the optical fibers to the lenses and ultimately to the optical electronic devices.

Silicon waferboard technology is used rather extensively in the invention of the present disclosure as the optical bench for the optical electronic devices. In addition, alignment fiducials to include x-y alignment pedestals and z-alignment standoffs are also used to accurately locate and precisely align in a passive manner the optical electronic devices of the present invention.

DETAILED DESCRIPTION OF THE INVENTION

Figure 1:
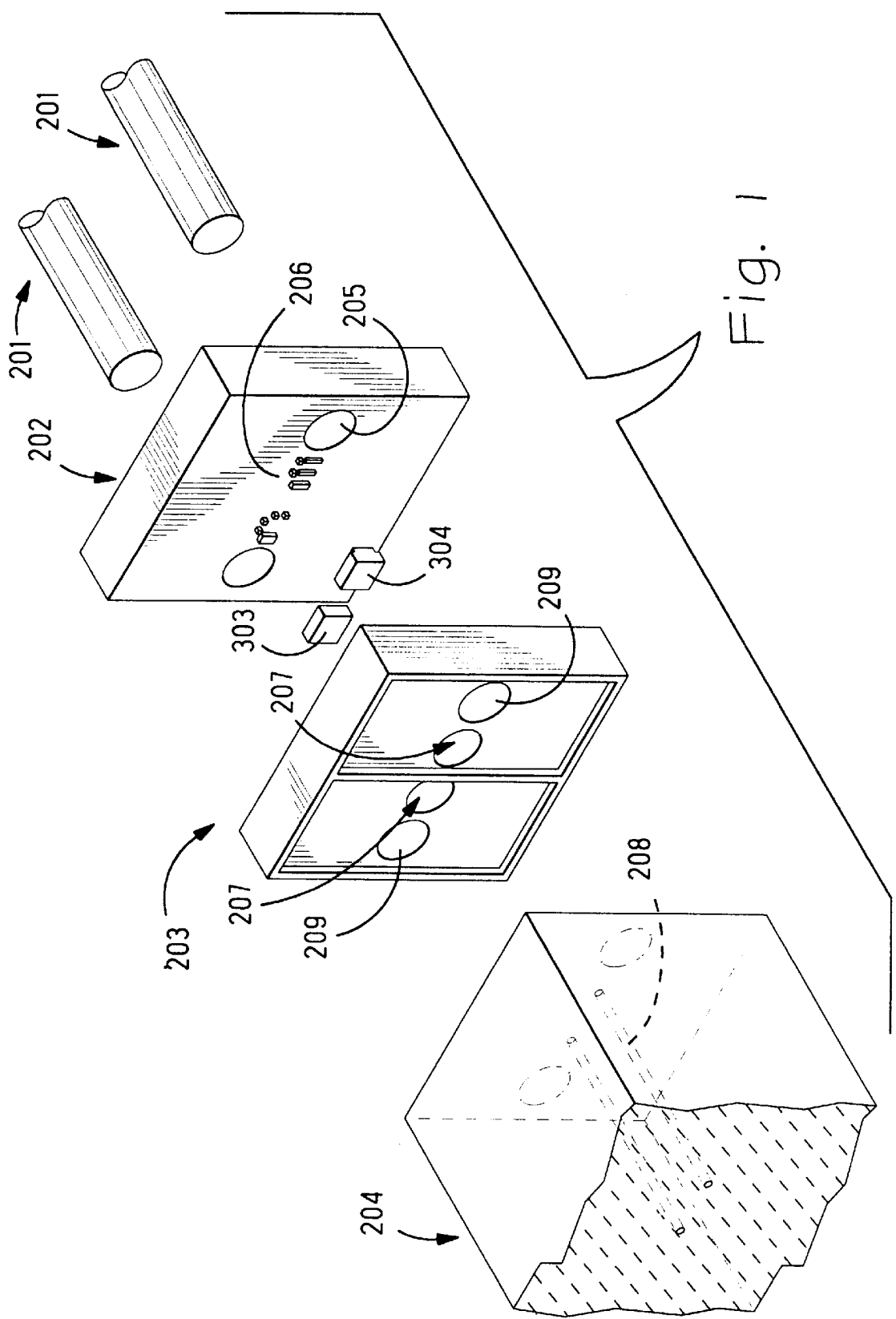
FIG. 1 shows an example of this invention in a mini MT-RJ transceiver. The silicon wafer board has two circular holes for alignment with respect to guide pins.
Figure 5:
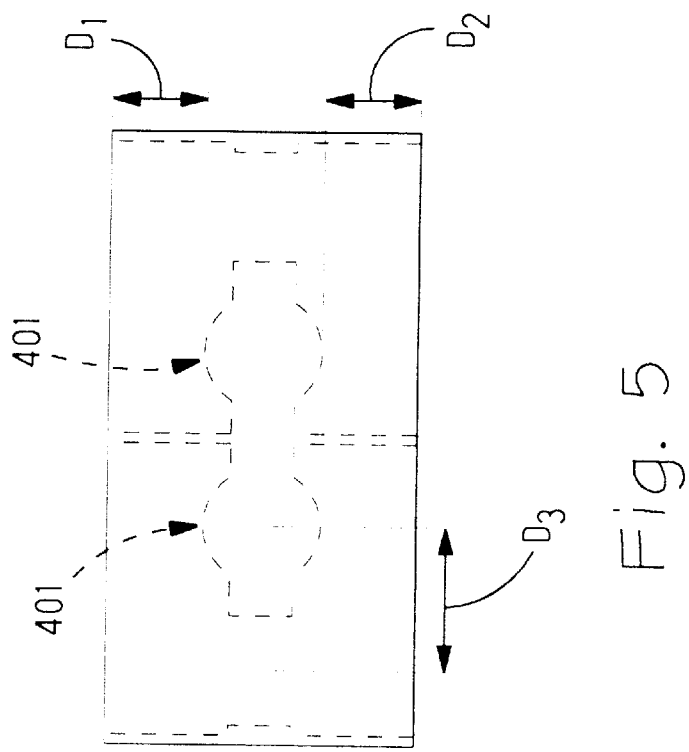
FIG. 5 is a top view of the light coupling device of FIG. 4.
Figure 4:
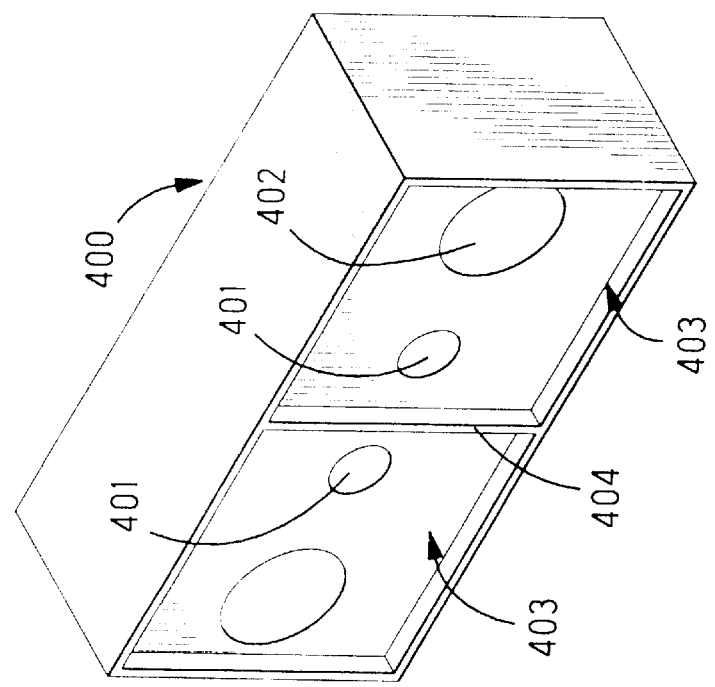
FIG. 4 is a perspective view of the light coupling device of the present disclosure.

FIG. 1 shows an example of this invention in a MT-RJ transceiver. The guide pins 201 provide alignment through silicon wafer board 2D2, light coupling device 203, and mini-MT ferrule in a RJ connector 204. For silicon wafer board in FIG. 1, a dry etching with sub-micron accuracy process is used to produce the two circular shaped holes 205 for alignment with the guide pins 201 and different shaped pedestals and standoffs 206, 301 for passive alignment: with the optoelectronic chips 303, 304 in the x-y and z directions, respectively. The dry etching technique is well known to one of ordinary skill in the art. The optoelectronic chips have the mating notches, cleaved edges, and/or other alignment fiducials for passive alignment with the silicon wafer board. The light coupling device has two holes 209 for alignment with the guide pins 201 and two lenses 207 for collimating the light from the optoelectronic chips to the fiber in the mini-MT ferrule and vice versa. The precise locations of these two lenses with respect to the two holes in this light coupling device provide a very effective method of light coupling between the fibers and the optoelectronic chips. Turning to FIGS. 4 and 5, the lenses 401 as well as the alignment holes 402 for receiving the pin are shown disposed on the light coupling device 400. The light coupling device is fabricated from polymer material, for example Redal. However, other materials such as polycarbonate or suitable polymers or plastics within the purview of one of ordinary skill in the art can be used to fabricate the light coupling device 400. The lenses 401 are molded and are maintained at a precise distance D3 from the center of the guide pins 402 as is shown in top view in FIG. 5. The light coupling device 400 has a recess on each side shown as 403. The recess is also on the reverse side of the light coupling device. This recess enables a tight control of the distance between the lens 401 and the optical fiber on one side and the distance between the lens and the optical electronic device on the other side. Finally, the ridge 404 between the lenses 401 is to minimize cross-talk, as it must be remembered that one lens couples light between a fiber and a light emitting device and the other lens couples light between a fiber and a light detecting device.

The distance between the lenses 207,401 and the optoelectronic devices 303,304 is shown as D1 in FIG. 5 and the distance between the lenses 207,401 and the optical fibers 208 is shown as D2 is FIG. 5. Furthermore, again as shown in FIG. 5, the distance between the lenses 401 and the guide pin holes 402 is designated as D3. These distances are controlled with great precision to properly couple the optoelectronic devices and the optical fibers to the lens elements 401. Through the optical coupling device 400, a precise coupling between the fibers 208 (shown in FIG. 2) is achieved.

Figure 2:
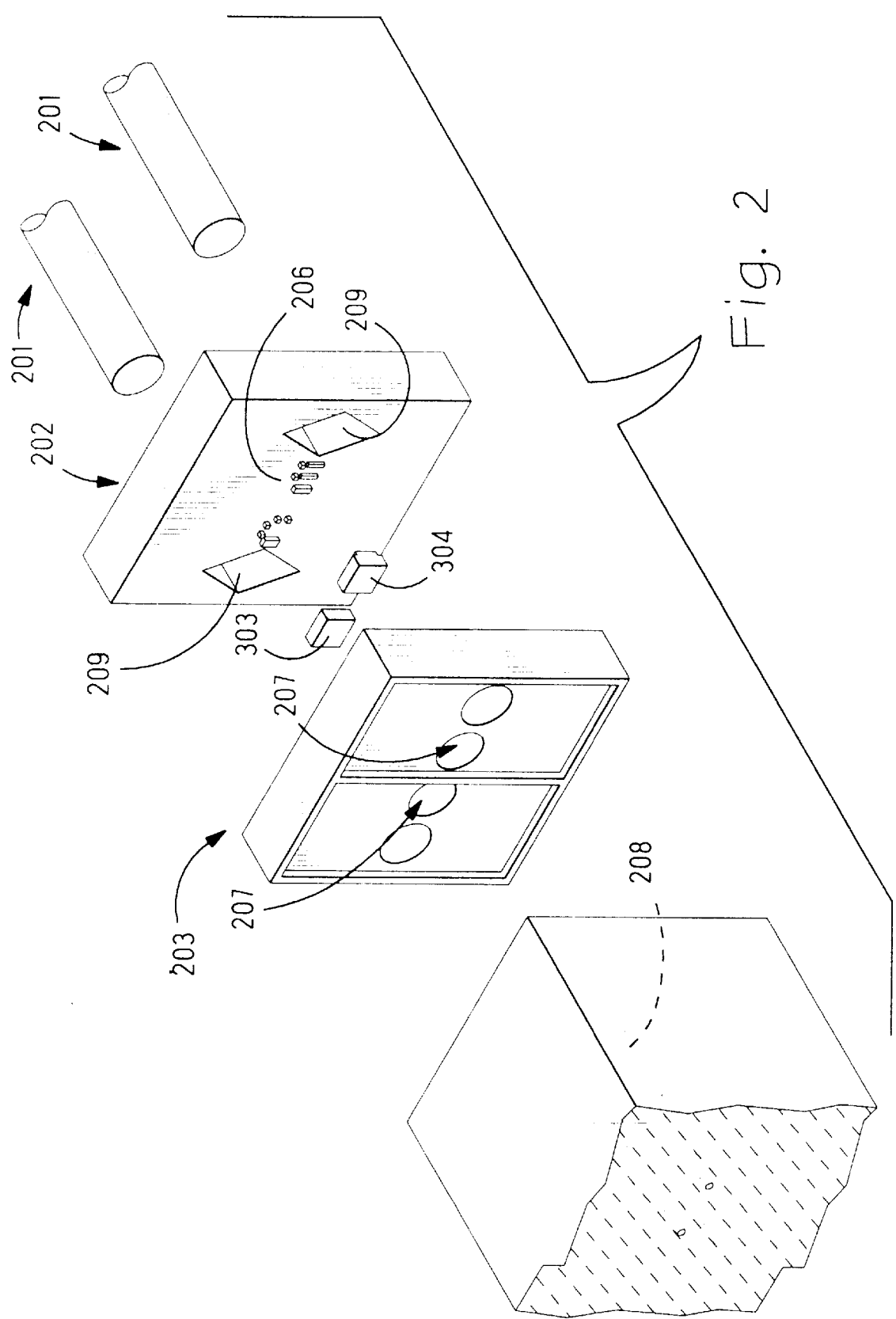
FIG. 2 shows another example of this invention in a mini MT-RJ transceiver. The silicon wafer board has two diamond shape holes for alignment with respect to guide pins.

The apparatus shown in FIG. 2 is similar to that FIG. 1, except a wet etching process with sub-micron accuracy is used to produce the two diamond shaped holes 209 in the silicon wafer board with certain crystal orientation. The light coupling device is the same in both embodiments. The wet etching technique is well known to one of ordinary skill in the art.

Figure 3:
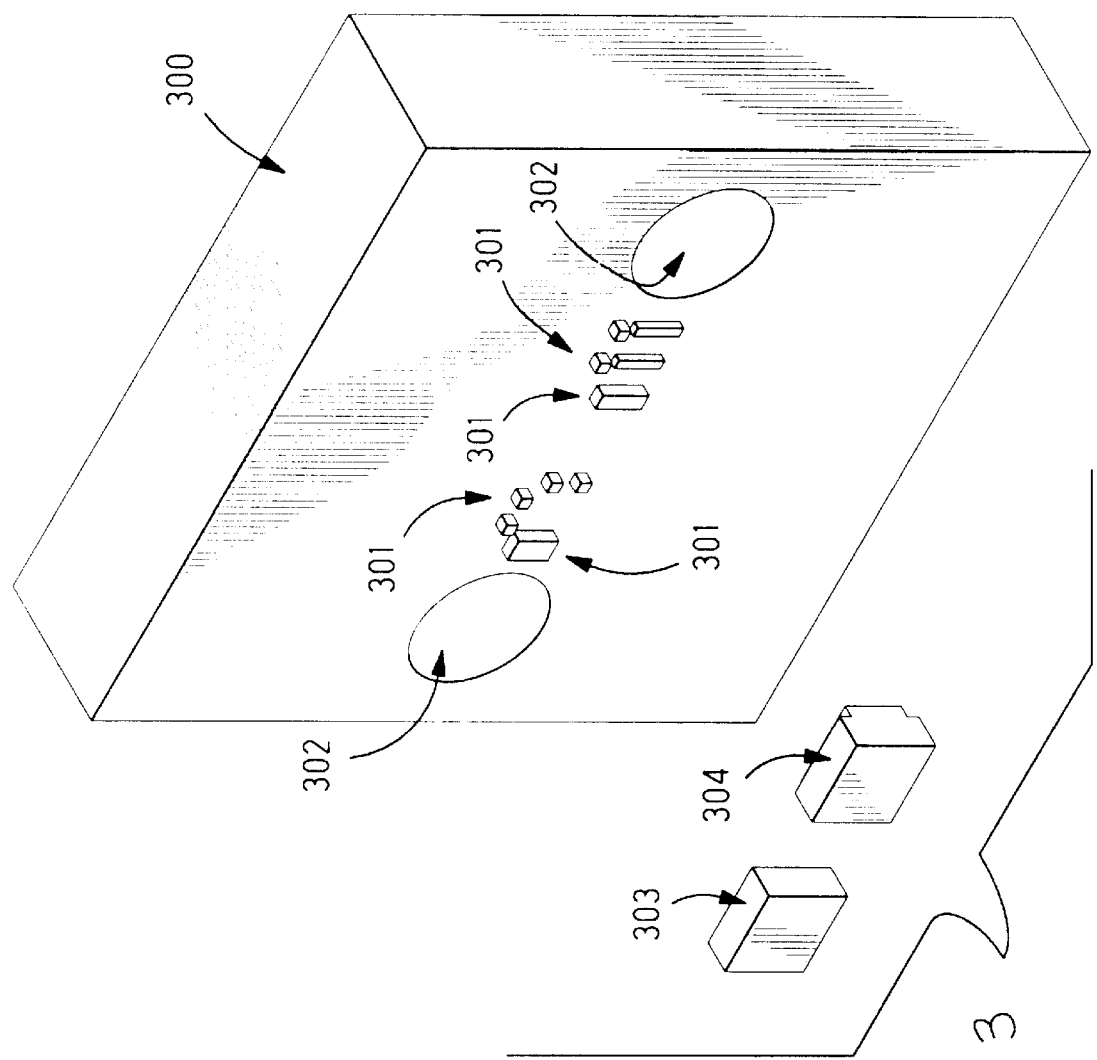
FIG. 3 shows the pedestals and standoffs on the silicon wafer board for passive alignment with the optoelectronic chips in the x-y and z directions, respectively.

The mating of the silicon wafer board and the optoelectronic chips 303 is shown in FIG. 3. The pedestals and standoffs 301 are schematically shown on the silicon wafer board. The notches and/or cleaved edges are shown on the optoelectronic chips. The passive alignment fiducials 301 are shown in FIG. 3. The holes for the guide pins 302 are for receiving the guide pins 201. The devices shown as 303, 304 are the surface emitting/detecting devices of the present disclosure. In the present embodiment, 303 is a PIN detector while the device 304 is a transmitting device, for example VCSEL or a surface emitting LED (SLED). The choice of the devices is dependent upon the ultimate use of the device as it is well known to one of ordinary skill in the art that light emitting diodes are for lower speed (transmission rate) operation and lasers are for higher data rate operation. In either event, the alignment fiducials, pedestals and standoffs, provide for x,y and z alignment via the silicon waferboard 300. These alignment fiducials are fabricated by techniques well known to one of ordinary skill in the art, and can be fabricated by both wet and dry etching techniques.

The invention having been described in detail, it is clear that various modifications and variations of the present disclosure are readily apparent to one of ordinary skill in the art having had the benefit of the present disclosure. To the (extent that a mini-MT ferrule having optical fibers that are coupled to surface emitting/detecting optical electronic devices by way of a light coupling device as disclosed herein as well as the passive alignment used to align the optical electronic devices, the lenses and the fibers as disclosed herein is within the purview of one of ordinary skill in the art, such redeemed to be within the scope of the present invention.

I claim:

1. An optoelectronic transceiver, comprising:

a ferrule having a transmission optical fiber and a reception optical fiber disposed therein;

an optical coupler disposed adjacent to said ferrule and in optical communication with said optical fibers;

a substrate having an optoelectronic surface emitting device and an optoelectronic surface detecting device disposed thereon, said optoelectronic detecting device and said optoelectronic emitting device in optical communication with said optical coupler;

selectively disposed holes in said coupler and said substrate;

and guide pins for aligning said coupler to said substrate, said pins being disposed in said holes.

2. An optoelectronic transceiver as recited in claim 1 wherein said substrate is silicon.

3. An optoelectronic transceiver as recited in claim 2 wherein said silicon substrate has selectively disposed X-Y alignment pedestals and Z-alignment standoffs for passive alignment of said optoelectronic surface emitting and said optoelectronic surface detecting devices.

4. An optoelectronic transceiver as recited in claim 1 wherein said optical coupler has selectively disposed holograms for coupling light between said optical fibers and said optoelectronic detecting device and said optoelectronic emitting device.

5. An optoelectronic transceiver as recited in claim 1 wherein said optical coupler has selectively disposed lenses for coupling light between said fibers and said optoelectronic detecting device and said optoelectronic emitting device.

6. An optoelectronic transceiver as recited in claim 1 wherein said optical coupler has a cross-talk minimizing ridge disposed between lenses on said optical coupler.

* * * * *